US012651994B2

(12) United States Patent
Li et al.

(10) Patent No.: US 12,651,994 B2
(45) Date of Patent: Jun. 9, 2026

(54) BRAKING TEMPERATURE CONTROL METHOD AND SYSTEM FOR ELECTROMECHANICAL BRAKE

(71) Applicant: INSTITUTE OF ELECTRICAL ENGINEERING, CHINESE ACADEMY OF SCIENCES, Beijing (CN)

(72) Inventors: Xiaolong Li, Beijing (CN); Lifang Wang, Beijing (CN); Jinfang Gou, Beijing (CN); Zhigang Zhang, Beijing (CN)

(73) Assignee: INSTITUTE OF ELECTRICAL ENGINEERING, CHINESE ACADEMY OF SCIENCES, Beijing (CN)

( * ) Notice: Subject to any disclaimer, the term of this patent is extended or adjusted under 35 U.S.C. 154(b) by 260 days.

(21) Appl. No.: 18/672,698

(22) Filed: May 23, 2024

(65) Prior Publication Data

US 2024/0313692 A1     Sep. 19, 2024

Related U.S. Application Data

(63) Continuation of application No. PCT/CN2023/081192, filed on Mar. 14, 2023.

(30) Foreign Application Priority Data

Sep. 26, 2022     (CN) ......................... 202211174538.5

(51) Int. Cl.
*H02P 29/64*          (2016.01)
*B60T 8/172*          (2006.01)
(Continued)

(52) U.S. Cl.
CPC .............. *H02P 29/64* (2016.02); *B60T 8/172* (2013.01); *B60T 8/17554* (2013.01);
(Continued)

(58) Field of Classification Search
CPC ...... H02P 29/64; B60T 8/172; B60T 8/17554; B60T 17/22; F16D 65/78; F16D 2065/783
See application file for complete search history.

(56) References Cited

U.S. PATENT DOCUMENTS

| | | | | |
|---|---|---|---|---|
| 2007/0052380 | A1* | 3/2007 | Lai ............................ | G06F 1/20 |
| | | | | 318/400.41 |
| 2022/0242382 | A1* | 8/2022 | Dong ..................... | B60T 13/748 |
| 2025/0196823 | A1* | 6/2025 | Shibata ................... | B60T 8/172 |

FOREIGN PATENT DOCUMENTS

| | | |
|---|---|---|
| CN | 108394385 A | 8/2018 |
| CN | 111552331 A | 8/2020 |

(Continued)

OTHER PUBLICATIONS

International Search Report and Written Opinion in counterpart International Application No. PCT/CN2023/081192, mailed Jun. 20, 2023, 10 pages.

(Continued)

*Primary Examiner* — Zoheb S Imtiaz
(74) *Attorney, Agent, or Firm* — Edell, Shapiro & Finnan, LLC

(57)          ABSTRACT

Provided are a braking temperature control method and system for an electromechanical brake. In the braking temperature control method for an electromechanical brake provided by the present disclosure, an intermediate temperature is obtained based on temperatures acquired by thermistors mounted on a stator winding, and a braking temperature control solution is generated based on a relationship between the intermediate temperature and a preset tempera- (Continued)

ture, to control the heating of an electromechanical braking (EMB) driving motor. Therefore, under a conventional temperature control strategy, the operating environment of the EMB driving motor can be effectively improved, and the EMB efficiency is ensured. In addition, in a high-temperature abnormal operating state of the EMB driving motor, the operating temperature of the driving motor can be effectively controlled through a braking force redistribution strategy, thereby avoiding the braking failure caused by motor overheating.

8 Claims, 4 Drawing Sheets

(51) Int. Cl.
*B60T 8/1755* (2006.01)
*B60T 17/22* (2006.01)
*F16D 65/78* (2006.01)

(52) U.S. Cl.
CPC .............. *B60T 17/22* (2013.01); *F16D 65/78* (2013.01); *F16D 2065/783* (2013.01)

(56) References Cited

FOREIGN PATENT DOCUMENTS

| CN | 113612422 A | 11/2021 |
| CN | 115441807 A | 12/2022 |
| JP | 2012071678 A | 4/2012 |

OTHER PUBLICATIONS

Wang. Zhixin et al., "Temperature Estimation of Electromechanical Brake System Based on the Study of Power System (EMB)", Automation & Instrumentation, No. 03, Mar. 25, 2015 (Mar. 25, 2015), pp. 67-70.

* cited by examiner

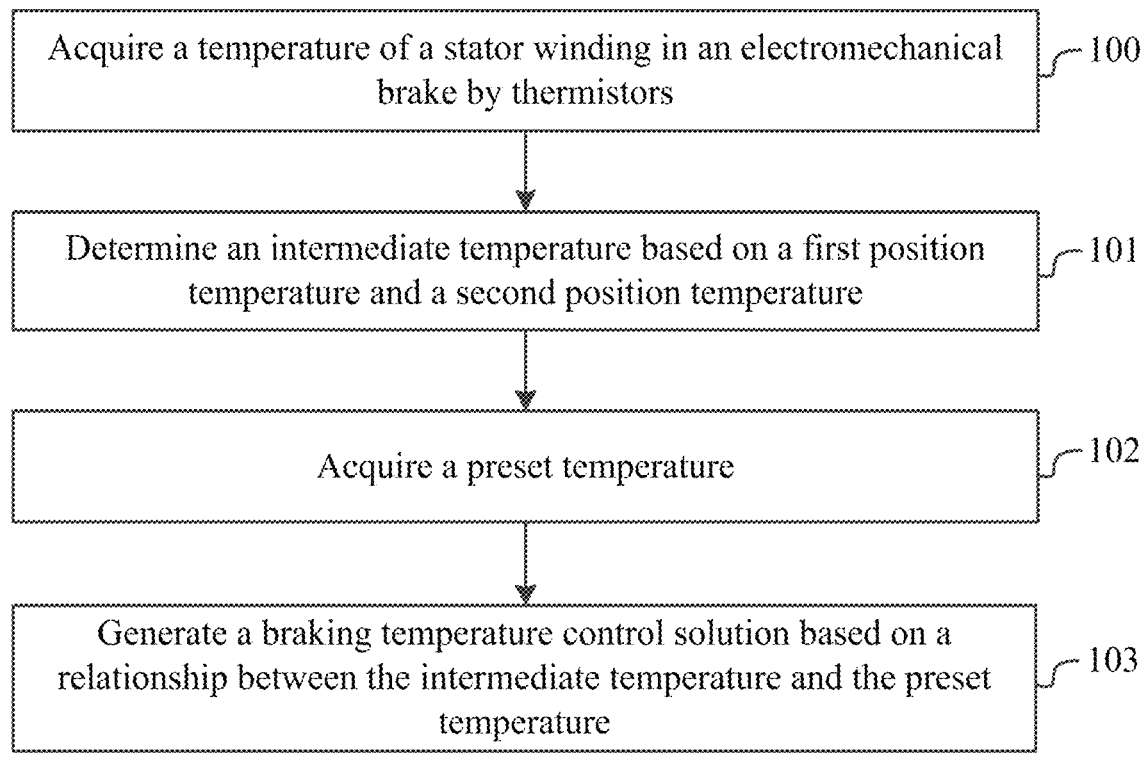

| Acquire a temperature of a stator winding in an electromechanical brake by thermistors | ⌐100 |

| Determine an intermediate temperature based on a first position temperature and a second position temperature | ⌐101 |

| Acquire a preset temperature | ⌐102 |

| Generate a braking temperature control solution based on a relationship between the intermediate temperature and the preset temperature | ⌐103 |

FIG. 1

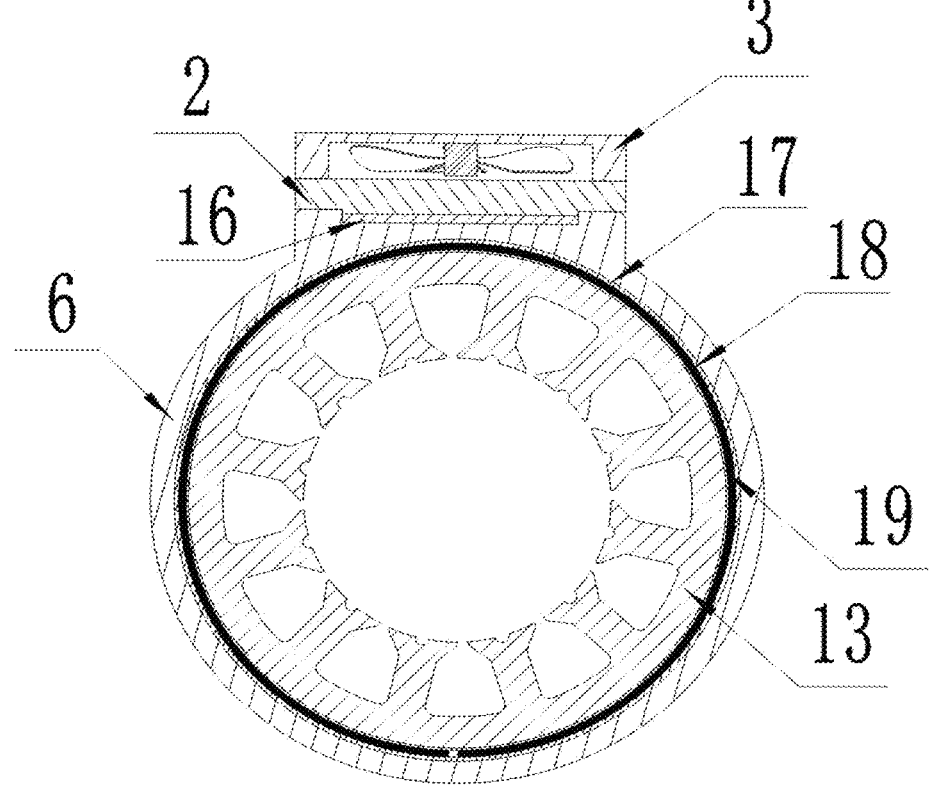

FIG. 2

BRAKING TEMPERATURE CONTROL METHOD AND SYSTEM FOR ELECTROMECHANICAL BRAKE

CROSS REFERENCE TO RELATED APPLICATIONS

This application is a continuation of International Patent Application No. PCT/CN2023/081192, filed on Mar. 14, 2023, which claims priority from Chinese Patent Application No. 202211174538.5, entitled "BRAKING TEMPERATURE CONTROL METHOD AND SYSTEM FOR ELECTROMECHANICAL BRAKE", filed on Sep. 26, 2022, the disclosures of which are incorporated herein by reference in their entireties.

TECHNICAL FIELD

The present disclosure relates to the technical field of automobile part temperature control, and in particular, to a braking temperature control method and system for an electromechanical brake.

BACKGROUND

The electromechanical braking (EMB) system is a new-type braking mechanism driven by a motor, and its operating principle is that a driving motor generates a stable braking force by stalling. If the EMB driving motor does not have good heat dissipation, in a continuous braking process, the motor is prone to overheating due to continuous stalling. After the temperature of a stator winding increases continuously, the resistance inside the motor also increases, resulting in a decrease in motor efficiency and output torque. In addition, heat generated when a friction pad and a brake disc are pressed against each other will also be transferred to the driving motor. Under extremely harsh braking conditions, the overheating of the EMB driving motor caused by multiple factors is likely to cause a coil winding to burn out and the braking to fail.

Currently, among the existing disclosed technologies, there is no relevant technical solution that effectively solves the heating problem of the EMB driving motor. Therefore, it is necessary to carry out technological innovation in terms of EMB mechanism design and temperature control strategy.

SUMMARY

Based on the above problems, the present disclosure provides a braking temperature control method and system for an electromechanical brake.

To achieve the above objective, the present disclosure provides the following solutions.

A braking temperature control method for an electromechanical brake, applied to a vehicle having an electromechanical brake mounted on each wheel, where the electromechanical brake includes a stator winding, thermistors, a fan, a ventilation fin, and a thermoelectric semiconductor chilling plate; the thermistors are disposed at a first position and a second position of the stator winding; the first position and the second position are symmetrical; and the fan is disposed between the thermoelectric semiconductor chilling plate and the stator winding; and the braking temperature control method for an electromechanical brake includes:

acquiring a temperature of the stator winding in the electromechanical brake by the thermistors, where the temperature of the stator winding includes a first position temperature and a second position temperature;

determining an intermediate temperature based on the first position temperature and the second position temperature;

acquiring a preset temperature, where the preset temperature includes a first preset temperature, a second preset temperature, a third preset temperature, and a fourth preset temperature; and generating a braking temperature control solution based on a relationship between the intermediate temperature and the preset temperature.

Preferably, the generating a braking temperature control solution based on a relationship between the intermediate temperature and the preset temperature specifically includes:

when the intermediate temperature is less than the first preset temperature, performing no processing;

when the intermediate temperature is greater than or equal to the first preset temperature and less than the second preset temperature, electrifying the thermoelectric semiconductor chilling plate, controlling a current value of the thermoelectric semiconductor chilling plate to be a first current value, starting the fan, and controlling a rotational speed of the fan to be a first rotational speed;

when the intermediate temperature is greater than or equal to the second preset temperature and less than the third preset temperature, controlling the current value of the thermoelectric semiconductor chilling plate to be a second current value, and controlling the rotational speed of the fan to be a second rotational speed, where the second current value is greater than the first current value, and the second rotational speed is greater than the first rotational speed;

when the intermediate temperature is greater than or equal to the third preset temperature and less than the fourth preset temperature, controlling the current value of the thermoelectric semiconductor chilling plate to be a third current value, and controlling the rotational speed of the fan to be a third rotational speed, where the third current value is greater than the second current value, and the third rotational speed is greater than the second rotational speed; and when the intermediate temperature is greater than or equal to the fourth preset temperature, generating high-temperature early-warning, reducing the current value of the thermoelectric semiconductor chilling plate, and completing wheel braking through a braking force distribution strategy.

Preferably, the braking force distribution strategy includes:

reducing a clamping force output by the electromechanical brake that generates the high-temperature early-warning to 80% of an original clamping force, and adjusting clamping forces output by the electromechanical brakes at other wheels in the vehicle to meet a regulation criterion, where the regulation criterion includes a braking strength maintenance criterion, a vehicle stability criterion, and a maximum clamping force criterion.

Preferably, the braking strength maintenance criterion is for maintaining a far target braking strength of the vehicle unchanged.

Preferably, the vehicle stability criterion is for maintaining a torque generated by the vehicle's longitudinal force and transverse force on the vehicle's center of mass to be zero.

Preferably, the maximum clamping force criterion is for minimizing the clamping forces output by all the electromechanical brakes in the vehicle without exceeding the maximum clamping force of each electromechanical brake.

Preferably, the intermediate temperature is $T_{real}$.

$T_{real}=\max\{T_{r1}, T_{r2}\}$, where $T_{r1}$ is the first position temperature, $T_{r2}$ is the second position temperature, and $\max\{*\}$ is a maximum assignment function.

According to specific embodiments provided in the present disclosure, the present disclosure has the following technical effects:

In the braking temperature control method for an electromechanical brake provided by the present disclosure, an intermediate temperature is obtained based on temperatures which are acquired by thermistors mounted on a stator winding, and a braking temperature control solution is generated based on a relationship between the intermediate temperature and a preset temperature, to control the heating of an electromechanical braking (EMB) driving motor. Therefore, under a conventional temperature control strategy, the operating environment of the EMB driving motor can be effectively improved, and the EMB efficiency is ensured. In addition, in a high-temperature abnormal operating state of the EMB driving motor, the operating temperature of the driving motor can be effectively controlled through a braking force redistribution strategy, thereby avoiding the braking failure caused by motor overheating.

In addition, the present disclosure further provides a braking temperature control system for an electromechanical brake, applied to a vehicle having an electromechanical brake mounted on each wheel, where the electromechanical brake includes a stator winding, thermistors, a fan, a ventilation fin, and a thermoelectric semiconductor chilling plate; the thermistors are disposed at a first position and a second position of the stator winding; the first position and the second position are symmetrical; and the fan is disposed between the thermoelectric semiconductor chilling plate and the stator winding; and the braking temperature control system for an electromechanical brake includes:

a temperature acquisition module, configured to acquire a temperature of the stator winding in the electromechanical brake by the thermistors, where the temperature of the stator winding includes a first position temperature and a second position temperature;

a temperature determination module, configured to determine an intermediate temperature based on the first position temperature and the second position temperature;

a preset temperature acquisition module, configured to acquire a preset temperature, where the preset temperature includes a first preset temperature, a second preset temperature, a third preset temperature, and a fourth preset temperature; and a temperature control solution generation module, configured to generate a braking temperature control solution based on a relationship between the intermediate temperature and the preset temperature.

Since the technical effects achieved by the braking temperature control system for an electromechanical brake provided by the present disclosure are the same as those of the braking temperature control method for an electromechanical brake provided above, no further description is given herein.

BRIEF DESCRIPTION OF THE DRAWINGS

To describe the technical solutions in embodiments of the present disclosure or in the prior art more clearly, the accompanying drawings required in the embodiments are briefly described below. Apparently, the accompanying drawings in the following description show merely some embodiments of the present disclosure, and other drawings can be derived from these accompanying drawings by those of ordinary skill in the art without creative efforts.

FIG. 1 is a flowchart of a braking temperature control method for an electromechanical brake according to the present disclosure;

FIG. 2 is a sectional view of a heat dissipation mechanism of an electromechanical brake according to embodiments of the present disclosure;

DETAILED DESCRIPTION

Figure 3:
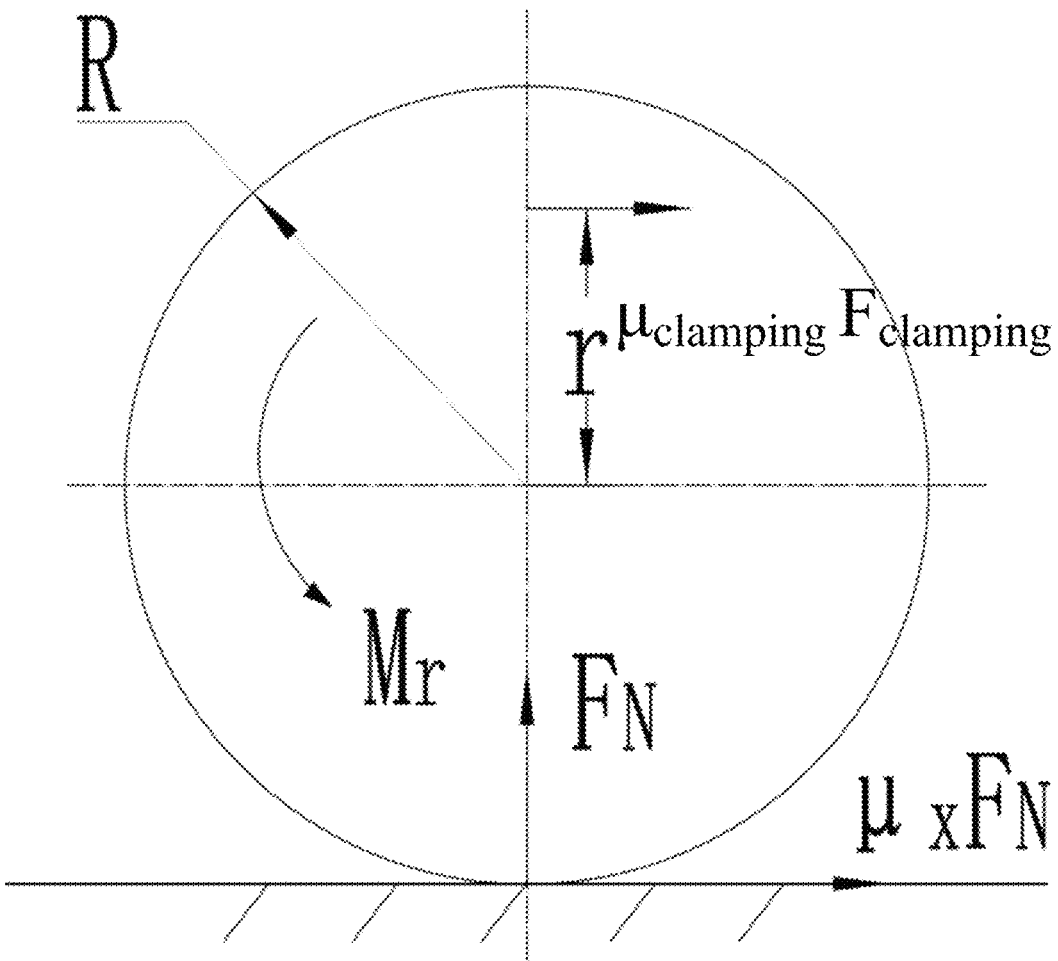
FIG. 3 is a schematic diagram of stress in a single-wheel braking state according to embodiments of the present disclosure.

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

An objective of the present disclosure is to provide a braking temperature control method and system for an electromechanical brake. Under a conventional temperature control strategy, the operating environment of an EMB driving motor can be effectively improved, and the braking efficiency of the EMB system is ensured. In a high-temperature abnormal operating state of the driving motor, the operating temperature of the driving motor can be effectively controlled through a braking force redistribution strategy, thereby avoiding the braking failure caused by motor overheating.

In order to make the above objective, features and advantages of the present disclosure clearer and more comprehensible, the present disclosure will be further described in detail below in combination with accompanying drawings and particular implementation modes.

The braking temperature control method for an electromechanical brake provided by the present disclosure is mainly applied to a vehicle having an electromechanical brake mounted on each wheel. As shown in FIG. 2, the electromechanical brake includes a stator winding 13, thermistors, a fan 3, a ventilation fin 2, a thermoelectric semiconductor chilling plate 16, a heat pipe substrate 17, a gravity assisted heat pipe 18, a high-thermal-conductivity insulating silicone sheet 19, and an outer housing 6. The thermistors are disposed at a first position and a second position of the stator winding 13. For example, the thermistors are respectively buried at the top and the bottom of the stator winding 13. The first position and the second position are symmetrical. The fan 3 is disposed between the thermo-electric semiconductor chilling plate 16 and the stator winding 13.

As shown in FIG. 1, the braking temperature control method for an electromechanical brake includes:

Step 100: acquire a temperature of the stator winding in the electromechanical brake by the thermistors. The temperature of the stator winding 13 includes a first position temperature and a second position temperature. For example, voltage change signals of the thermistors are subjected to conditioning, amplification and digital-to-analog conversion, and then transmitted to four independent brake control units (BCUs). The resistances of the thermistors are then calculated based on the Ohm's law, thereby obtaining precise temperatures (i.e., a first position temperature and a second position temperature) corresponding to two positions in the coil, which are recorded as $T_{r1}$ and $T_{r2}$, respectively.

Step 101: determine an intermediate temperature based on the first position temperature and the second position temperature. Specifically, the first position temperature $T_{r1}$ and the second position temperature $T_{r2}$ are compared, and a larger value is assigned to the intermediate temperature $T_{real}$, that is, $T_{real}=\max\{T_{r1}, T_{r2}\}$.

Step 102: acquire a preset temperature. The preset temperature includes a first preset temperature, a second preset temperature, a third preset temperature, and a fourth preset temperature.

Step 103: generate a braking temperature control solution based on a relationship between the intermediate temperature and the preset temperature. This step specifically includes:

Step 1031: when the intermediate temperature is less than the first preset temperature (that is, $T_{real}<T_1$), consider that the stator winding 13 of the EMB driving motor conducts heat to the outer housing 6 of the motor through the gravity assisted heat pipe 18, and under natural convection heat exchange conditions of the outer housing 6, the temperature of the stator winding 13 of the EMB driving motor meeting operating requirements.

Step 1032: when the intermediate temperature is greater than or equal to the first preset temperature and less than the second preset temperature (that is, $T_1 \leq T_{real}<T_2$), electrify the thermoelectric semiconductor chilling plate 16, control a current value of the thermoelectric semiconductor chilling plate 16 to be a first current value $I_1$, start the fan 3, and control a rotational speed of the fan 3 to be a first rotational speed $n_1$.

Step 1033: when the intermediate temperature is greater than or equal to the second preset temperature and less than the third preset temperature (that is, $T_2 \leq T_{real}<T_3$), control the current value of the thermoelectric semiconductor chilling plate 16 to be a second current value $I_2$, and control the rotational speed of the fan 3 to be a second rotational speed $n_2$. The second current value $I_2$ is greater than the first current value $I_1$. The second rotational speed $n_2$ is greater than the first rotational speed $n_1$.

Step 1034: when the intermediate temperature is greater than or equal to the third preset temperature and less than the fourth preset temperature (that is, $T_3 \leq T_{real} \leq T_4$), control the current value of the thermoelectric semiconductor chilling plate 16 to be a third current value $I_3$, and control the rotational speed of the fan 3 to be a third rotational speed $n_3$. The third current value $I_3$ is greater than the second current value $I_2$. The third rotational speed $n_3$ is greater than the second rotational speed $n_2$.

Step 1035: when the intermediate temperature is greater than or equal to the fourth preset temperature ($T_{real} \geq T_4$), generate high-temperature early-warning, reduce the current value of the thermoelectric semiconductor chilling plate 16, and complete wheel braking through a braking force distribution strategy. Specifically, when the intermediate temperature is greater than or equal to the fourth preset temperature ($T_{real} \geq T_4$), the BCU determines that the temperature of the stator winding 13 in the EMB driving motor is too high, and the BCU sends motor abnormality state information to an electronic control unit (ECU) to indicate EMB motor high-temperature early-warning on a vehicle display screen, thereby avoiding complete failure of the brake due to burnout of the stator winding 13 in the EMB driving motor. When a driver performs braking, the ECU obtains speed, position and other signals of a pedal, the braking strength of four wheels is determined through a certain algorithm, and the signals are transmitted to four BCUs, respectively.

In this case, on the one hand, the electrifying current of the thermoelectric semiconductor chilling plate 16 is keep as $I_3$, and the rotational speed of the fan 3 is kept as $n_3$. On the other hand, a clamping force $F_{clamping}$ output by the EMB is positively correlated to the current $I_{coil}$ of the stator winding 13, which can be expressed by $F_{clamping}=F(k) \cdot I_{coil}$, where $F(k)$ is a positive correlation function.

Therefore, by reducing the current of the stator winding 13, the clamping force output by the EMB is reduced to 80% of the target braking clamping force $F_{clamping}$, thereby alleviating the heating of the winding coil and intervening in a braking force distribution control strategy.

The specific implementation process of the braking force distribution control strategy is described below.

First, the stress of the wheels and the vehicle during braking is analyzed and explained:

for example, when a single wheel is taken as an analysis object, in the braking process, as shown in FIG. 3, the wheel is suffered by a frictional force $\mu_{clamping}F_{clamping}$ generated by the electromechanical brake tightening the brake disc, a vertical support force $F_N$ of the ground to a tire, a frictional force (longitudinal braking force) $\mu_x F_N$ of the ground acting on the tire, and an inertia moment $M_r$ of the tire, and a torque equilibrium equation of the single wheel is established:

$$M_r + \mu_x F_N R - \mu_{clamping}F_{clamping}r = 0 \qquad (1\text{-}1)$$

where $\mu_{clamping}$ is a frictional coefficient, R is the radius of a wheel, and r is a distance from a braking friction lining to a wheel rolling center. The inertia moment $M_r$ of the tire may be represented by the rotational inertia J and angular acceleration $d\omega/dt$ of the tire:

$$M_r = J\frac{d\omega}{dt} \qquad (1\text{-}2)$$

where the angular speed $\omega$ may be obtained by a wheel speed sensor at the wheel.

Therefore, the expression for the frictional force of a single tire is:

$$\mu_x F_N = \frac{\mu_{clamping} F_{clamping} r - J\dfrac{d\omega}{dt}}{R} \tag{1-3}$$

Figure 4:
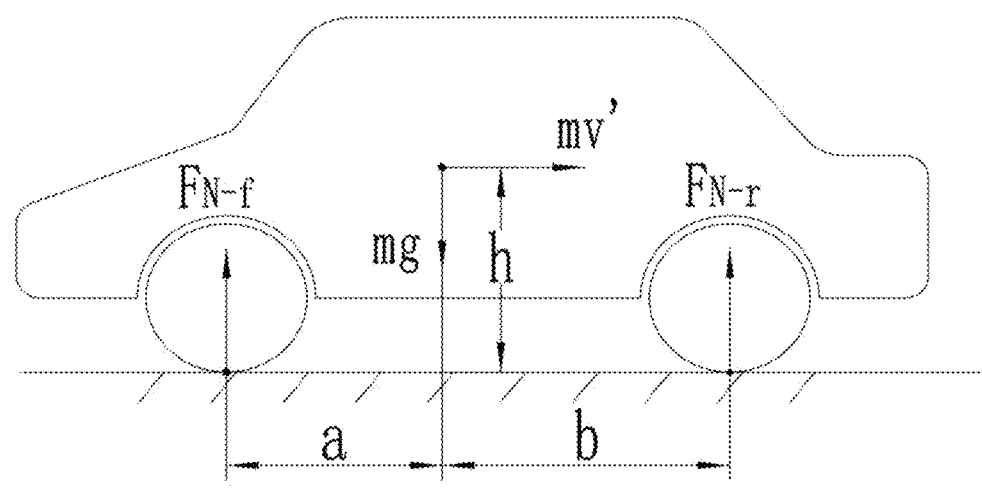
FIG. 4 is a schematic diagram of stress in a vehicle braking state according to embodiments of the present disclosure.

The entire vehicle is taken as an analysis object. As shown in FIG. 4, the gravity of the vehicle is mg. In the vehicle braking process, it is assumed that the vehicle is symmetrical from left to right, the vertical support forces of front and rear wheels on the ground are $F_{N-f}$ (front wheel) and $F_{N-r}$ (rear wheel), respectively. The distances from front and rear axles to the center of gravity are a and b, respectively; the height of the center of gravity of the vehicle from the ground is h, and the braking deceleration is v' (obtained by a vehicle body deceleration sensor), then a vehicle mechanics model is:

$$2F_{N-f}(a+b) = mgb - mv'h \tag{1-4}$$

$$2F_{N-r}(a+b) = mga + mv'h \tag{1-5}$$

and the expressions of the vertical support forces of the front and rear wheels are respectively:

$$F_{N-f} = \frac{mgb - mv'h}{2(a+b)} \tag{1-6}$$

$$F_{N-r} = \frac{mga + mv'h}{2(a+b)} \tag{1-7}$$

The four tires and the entire vehicle are taken as an analysis object. The longitudinal frictional forces of the four wheels on the ground in a local coordinate system are $\mu_{x-fl}F_{N-f}$ (front left wheel), $\mu_{x-fr}F_{N-f}$ (front right wheel), $\mu_{x-rl}F_{N-r}$ (rear left wheel), and $\mu_{x-rr}F_{N-r}$ (right rear wheel), respectively, where $\mu_{x-fl}$, $\mu_{x-fr}$, $\mu_{x-rl}$, and $\mu_{x-rr}$ are frictional coefficients of the front left wheel, the front right wheel, the rear left wheel, and the rear right wheel, respectively. The suffered transverse forces are $F_{y1}$ (front left wheel), $F_{y2}$ (front right wheel), $F_{y3}$ (rear left wheel), and $F_{y4}$ (rear right wheel), respectively. The slip angles of the four tires (included angle between the x-axis of a tire coordinate system and the direction of speed vectors of the wheels) are $\alpha_{fl}$, $\alpha_{fr}$, $\alpha_{rl}$, and $\alpha_{rr}$, respectively. The rotational angles of the front wheels are $\delta_{fl}$ and $\delta_{fr}$, respectively. The longitudinal speed, transverse speed and yaw angular speed of the vehicle are v, u, and $\omega_r$, respectively. c is a distance from a tire to the center of gravity of the vehicle. The expressions of the slip angles of the four tires are:

$$\alpha_{fl,fr} = \arctan\left(\frac{u + a\omega_r}{v \pm c\omega_r}\right) - \delta_{fl,fr} \tag{1-8}$$

$$\alpha_{rl,rr} = \arctan\left(\frac{u - b\omega_r}{v \pm c\omega_r}\right) \tag{1-9}$$

The transverse forces of the tires adopt a semi-empirical tire model proposed by Pacejka, and the expressions thereof are:

$$F_{y1,y2} = D\sin\{C\arctan[Ba_{fl,fr} - E(Ba_{fl,fr} - \arctan Ba_{fl,fr})]\} \tag{1-10}$$

$$F_{y3,y4} = D\sin\{C\arctan[Ba_{rl,rr} - E(Ba_{rl,rr} - \arctan Ba_{rl,rr})]\} \tag{1-11}$$

In the expressions, D is a peak factor, B is a stiffness factor, and E is a curvature factor, which are all related to the vertical loads of the tires and can be measured based on tire tests. C is a shape factor of the tires. The stress of the four wheels and the vehicle is as shown in FIG. 4.

Figure 5:
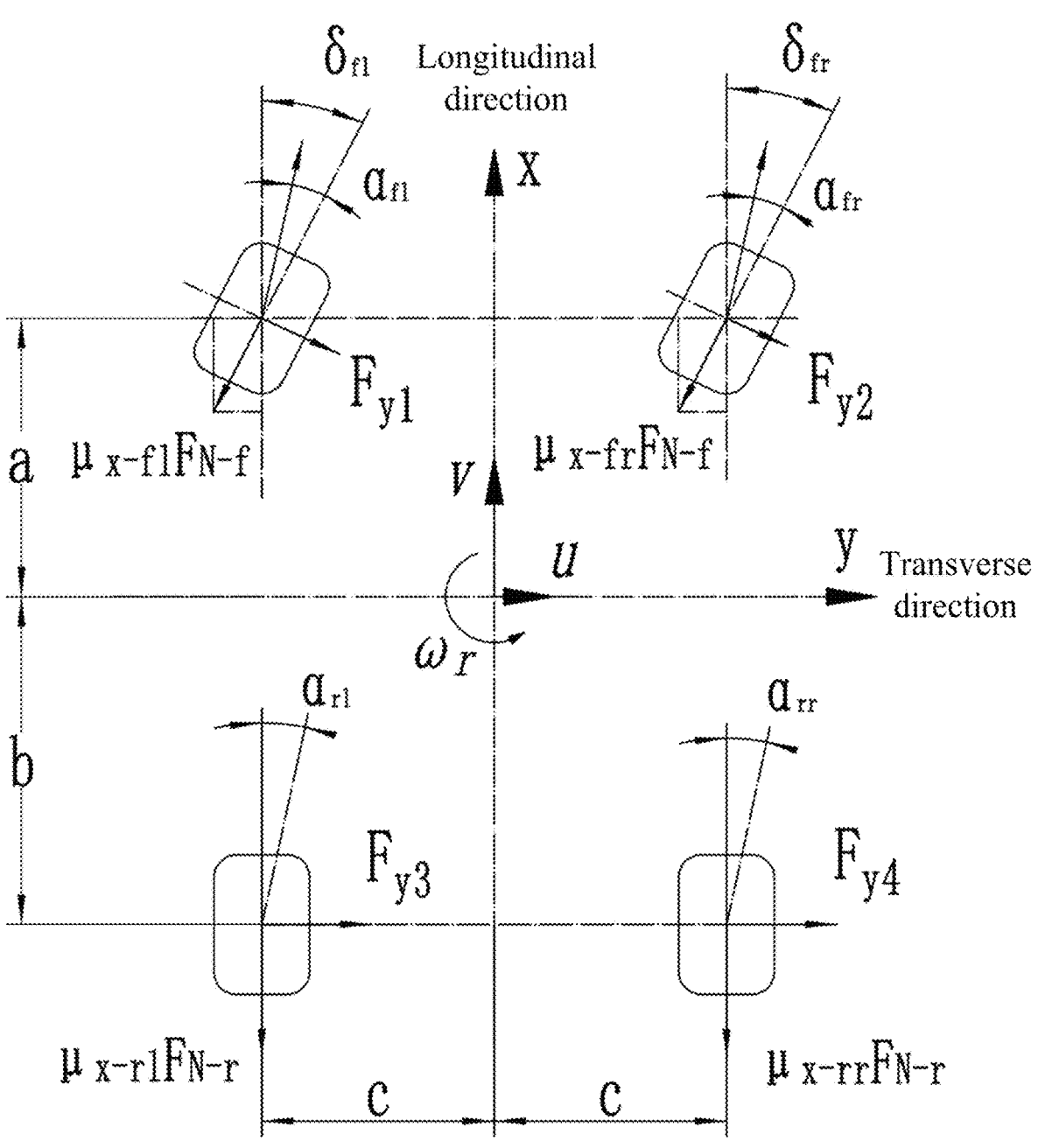
FIG. 5 is a schematic diagram of stress in a four-wheel and vehicle braking state according to embodiments of the present disclosure.

As shown in FIG. 5, by analyzing and explaining the dynamics of a single wheel and the entire vehicle, the relationship between the clamping force $F_{clamping}$ output by the EMB and various parameters in the vehicle braking process is clarified. Next, the braking force of the electro-mechanical brake motor in an overheated state is redistributed. Then, based on the above analysis, the braking force distribution control strategy provided in the present disclosure is:

a) when high-temperature early-warning of the EMB motor at the front left wheel or the front right wheel (taking the front right wheel as an example):

i) Braking Strength Maintenance Criterion

According to formula (1-3), it can be seen that the longitudinal braking forces of the wheels can be controlled by changing the clamping force $F_{clamping}$ output by the EMB. The clamping force output by the EMB motor of the front right wheel is reduced to 80% of the original clamping force. Therefore, it is necessary to adjust the clamping forces output by the other three EMB motors that are not heated, such that the longitudinal braking force of the vehicle should reach the original target longitudinal braking force, that is, the braking strength remains unchanged:

$$\mu'_{x-fl}F_{N-f}\cos\delta_{fl} + \mu'_{x-fr}F_{N-f}\cos\delta_{fr} + \mu'_{x-rl}F_{N-r} + \mu'_{x-rr}F_{N-r} = mv' \tag{1-12}$$

where $$\mu'_{x-fl}F_{N-f} = \frac{\mu_{clamping} F'_{clamping-fl} r - j\dfrac{d\omega fl}{dt}}{R} \tag{1-13}$$

$$\mu'_{x-fr}F_{N-f} = \frac{0.8\mu_{clamping} F'_{clamping-fr} r - j\dfrac{d\omega fr}{dt}}{R} \tag{1-14}$$

$$\mu'_{x-rl}F_{N-r} = \frac{\mu_{clamping} F'_{clamping-rl} r - j\dfrac{d\omega rl}{dt}}{R} \tag{1-15}$$

$$\mu'_{x-rr}F_{N-r} = \frac{\mu_{clamping} F'_{clamping-rr} r - j\dfrac{d\omega rr}{dt}}{R} \tag{1-16}$$

ii) Vehicle Stability Criterion

The torque generated by the vehicle's longitudinal force and transverse force on the center of mass is 0, thereby avoiding the yaw motion of the vehicle:

$$\left(\mu'_{x-fl}F_{N-f}\cos\delta_{fl} - F_{y1}\sin\delta_{fl}\right)c + \left(\mu'_{x-fl}F_{N-f}\sin\delta_{fl} - F_{y1}\cos\delta_{fl}\right)a - \quad (1-17)$$

$$\left(\mu'_{x-fr}F_{N-f}\cos\delta_{fr} - F_{y2}\sin\delta_{fr}\right)c + \left(\mu'_{x-fr}F_{N-f}\sin\delta_{fr} - F_{y2}\cos\delta_{fr}\right)a +$$

$$\mu'_{x-rl}F_{N-r}c + F_{y3}b - \mu'_{x-rr}F_{N-r}c + F_{y4}b = 0$$

iii) Maximum Clamping Force Criterion

The sum of the brake clamping forces of the adjusted motors should be taken as the minimum value, none of which exceeds the maximum clamping force output by each motor:

$$\sum F_{clamping} = \min\left(F'_{clamping-fl} + F'_{clamping-rl} + F'_{clamping-rr}\right) \quad (1-18)$$

$$F'_{clamping-fl} \leq F_{clamping-fl-max} \quad (1-19)$$

$$F'_{clamping-fl} \leq F_{clamping-fl-max} \quad (1-20)$$

$$F'_{clamping-rr} \leq F_{clamping-rr-max} \quad (1-21)$$

where fl is the front left wheel, fr is the front right wheel, rl is the rear left wheel, rr is the rear right wheel, $F'_{clamping-fl}$ is the EMB target braking clamping force of the front left wheel (adjusted motor braking clamping force), $F'_{clamping-rl}$ is the EMB target braking clamping force of the rear left wheel, $F'_{clamping-rr}$ is the EMB target braking clamping force of the rear right wheel, $F_{clamping-fl-max}$ is the maximum (rated) clamping force that the front left wheel EMB can output, $F_{clamping-rl-max}$ is the maximum clamping force that the rear left wheel EMB can output, and $F_{clamping-rr-max}$ is the maximum clamping force that the rear right wheel EMB can output.

When the EMB motor output at a certain wheel reaches the maximum clamping force, criteria ii) and iii) should be met first.

b) When the temperature of the stator windings 13 in the EMB at multiple wheels is too high, the current of the corresponding stator winding 13 is reduced to reduce the EMB output clamping force to 80% of the target braking clamping force. The braking force distribution at the remaining wheels should meet i) braking strength maintenance criterion, ii) vehicle stability criterion and iii) maximum clamping force criterion. When the EMB motor output at a certain wheel reaches the maximum clamping force, criteria ii) and iii) should be met first.

When the temperature $T_{real}$ in the stator winding 13 of the overheated EMB drops below T4, the original target clamping force output is restored, and the conventional temperature control strategy is restored.

Under most braking conditions, the heat of the stator winding 13 in the EMB can be completely dissipated by a passive heat dissipation system. Under relatively few braking conditions, an active cooling mode needs to be activated. When the EMB high-temperature early-warning occurs, that is, the EMB is in an abnormal state, and the braking force redistribution control strategy is involved. The purpose is to avoid complete failure of the brake due to the burnout of the stator winding 13 by sacrificing part of the braking strength, and the vehicle braking stability is ensured at the same time. When the vehicle is stopped, the driver should promptly arrange for maintenance or replacement of the EMB system.

Based on the above provided technical solutions, compared with the prior art, the present disclosure has the following advantages:

1) In the present disclosures, the thermistors monitor the temperature of the stator winding 13 in the EMB mechanism in real time during braking, the collected feedback signal is transmitted to the BCU, and the BCU implements a temperature control strategy with multiple cooling rates according to the heating condition of the stator winding 13, thereby ensuring stable operation of the EMB driving motor.

2) When the EMB driving motor is in a high-temperature abnormal state, the braking force redistribution control strategy is adopted to effectively avoid complete failure of the brake due to burnout of the stator winding 13, and take into account the braking stability of the vehicle at the same time.

In addition, the present disclosure further provides a braking temperature control system for an electromechanical brake, applied to a vehicle having an electromechanical brake mounted on each wheel. The electromechanical brake includes a stator winding 13, thermistors, a fan 3, a ventilation fin 2, and a thermoelectric semiconductor chilling plate 16. The thermistors are disposed at a first position and a second position of the stator winding 13. The first position and the second position are symmetrical. The fan 3 is disposed between the thermoelectric semiconductor chilling plate 16 and the stator winding 13.

Figure 6:
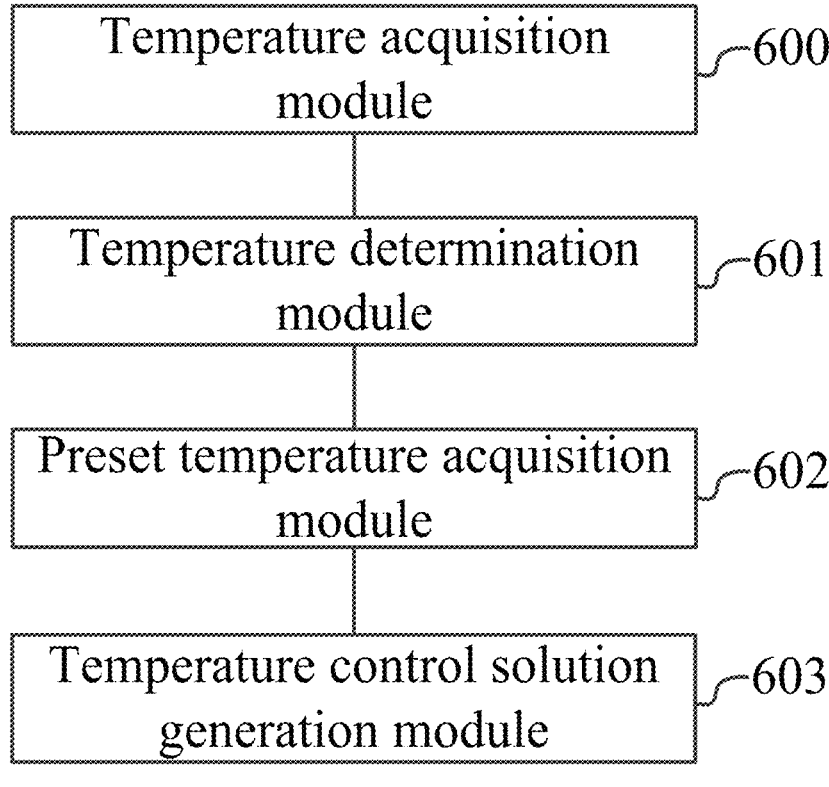
FIG. 6 is a schematic structural diagram of a braking temperature control system for an electromechanical brake according to embodiments of the present disclosure.

As shown in FIG. 6, the braking temperature control system for an electromechanical brake provided by the present disclosure includes:

a temperature acquisition module 600, configured to acquire the temperature of a stator winding 13 in an electromechanical brake by the thermistors, where the temperature of the stator winding 13 includes a first position temperature and a second position temperature;

a temperature determination module 602, configured to determine an intermediate temperature based on the first position temperature and the second position temperature;

a preset temperature acquisition module 602, configured to acquire a preset temperature, where the preset temperature includes a first preset temperature, a second preset temperature, a third preset temperature, and a fourth preset temperature; and a temperature control solution generation module 603, configured to generate a braking temperature control solution based on a relationship between the intermediate temperature and the preset temperature.

Each embodiment in the description is described in a progressive mode, each embodiment focuses on differences from other embodiments, and references can be made to each other for the same and similar parts between embodiments. Since the system disclosed in an embodiment corresponds to the method disclosed in an embodiment, the description is relatively simple, and for related contents, references can be made to the description of the method.

Particular examples are used herein for illustration of principles and implementation modes of the present disclosure. The descriptions of the above embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of the description shall not be construed as limitations to the present disclosure.

What is claimed:

1. A braking temperature control method for an electromechanical brake, applied to a vehicle having an electromechanical brake mounted on each wheel, wherein the electromechanical brake comprises a stator winding, thermistors, a fan, a ventilation fin, and a thermoelectric semiconductor chilling plate; the thermistors are disposed at a first position and a second position of the stator winding; the first position and the second position are symmetrical; and the fan is disposed between the thermoelectric semiconductor chilling plate and the stator winding; and the braking temperature control method for an electromechanical brake comprises:

acquiring a temperature of the stator winding in the electromechanical brake by the thermistors, wherein the temperature of the stator winding comprises a first position temperature and a second position temperature;

determining an intermediate temperature based on the first position temperature and the second position temperature;

acquiring a preset temperature, wherein the preset temperature comprises a first preset temperature, a second preset temperature, a third preset temperature, and a fourth preset temperature; and generating a braking temperature control solution based on a relationship between the intermediate temperature and the preset temperature; and controlling heating of an electromechanical braking (EMB) driving motor based upon the braking temperature control solution.

2. The braking temperature control method for an electromechanical brake according to claim 1, wherein the generating a braking temperature control solution based on a relationship between the intermediate temperature and the preset temperature specifically comprises:

when the intermediate temperature is less than the first preset temperature, performing no processing;

when the intermediate temperature is greater than or equal to the first preset temperature and less than the second preset temperature, electrifying the thermoelectric semiconductor chilling plate, controlling a current value of the thermoelectric semiconductor chilling plate to be a first current value, starting the fan, and controlling a rotational speed of the fan to be a first rotational speed;

when the intermediate temperature is greater than or equal to the second preset temperature and less than the third preset temperature, controlling the current value of the thermoelectric semiconductor chilling plate to be a second current value, and controlling the rotational speed of the fan to be a second rotational speed, wherein the second current value is greater than the first current value, and the second rotational speed is greater than the first rotational speed;

when the intermediate temperature is greater than or equal to the third preset temperature and less than the fourth preset temperature, controlling the current value of the thermoelectric semiconductor chilling plate to be a third current value, and controlling the rotational speed of the fan to be a third rotational speed, wherein the third current value is greater than the second current value, and the third rotational speed is greater than the second rotational speed; and when the intermediate temperature is greater than or equal to the fourth preset temperature, generating high-temperature early-warning, reducing the current value of the thermoelectric semiconductor chilling plate, and completing wheel braking through a braking force distribution strategy.

3. The braking temperature control method for an electromechanical brake according to claim 2, wherein the braking force distribution strategy comprises:

reducing a clamping force output by the electromechanical brake that generates the high-temperature early-warning to 80% of an original clamping force, and adjusting clamping forces output by the electromechanical brakes at other wheels in the vehicle to meet a regulation criterion, wherein the regulation criterion comprises a braking strength maintenance criterion, a vehicle stability criterion, and a maximum clamping force criterion.

4. The braking temperature control method for an electromechanical brake according to claim 3, wherein the braking strength maintenance criterion is for maintaining a far target braking strength of the vehicle unchanged.

5. The braking temperature control method for an electromechanical brake according to claim 3, wherein the vehicle stability criterion is for maintaining a torque generated by the vehicle's longitudinal force and transverse force on the vehicle's center of mass to be zero.

6. The braking temperature control method for an electromechanical brake according to claim 3, wherein the maximum clamping force criterion is for minimizing the clamping forces output by all the electromechanical brakes in the vehicle without exceeding the maximum clamping force of each electromechanical brake.

7. The braking temperature control method for an electromechanical brake according to claim 1, wherein the intermediate temperature is $T_{real}$:

$T_{real} = \max\{T_{r1}, T_{r2}\}$, wherein $T_{r1}$ is the first position temperature, $T_{r2}$ is the second position temperature, and $\max\{*\}$ is a maximum assignment function.

8. A braking temperature control system for an electromechanical brake, applied to a vehicle having an electromechanical brake mounted on each wheel, wherein the electromechanical brake comprises a stator winding, thermistors, a fan, a ventilation fin, and a thermoelectric semiconductor chilling plate; the thermistors are disposed at a first position and a second position of the stator winding; the first position and the second position are symmetrical; and the fan is disposed between the thermoelectric semiconductor chilling plate and the stator winding; and the braking temperature control system for an electromechanical brake comprises:

a temperature acquisition module, configured to acquire a temperature of the stator winding in the electromechanical brake by the thermistors, wherein the temperature of the stator winding comprises a first position temperature and a second position temperature;

a temperature determination module, configured to determine an intermediate temperature based on the first position temperature and the second position temperature;

a preset temperature acquisition module, configured to acquire a preset temperature, wherein the preset temperature comprises a first preset temperature, a second preset temperature, a third preset temperature, and a fourth preset temperature; and a temperature control solution generation module, configured to generate a braking temperature control solution based on a relationship between the intermediate temperature and the preset temperature; and a controller that controls heating of an electromechanical braking (EMB) driving motor based upon the braking temperature control solution.

* * * * *